Oct. 8, 1968 S. M. KAVIEFF 3,404,636
APPARATUS AND METHOD FOR FINAL ASSEMBLY OF AUTOMOTIVE VEHICLES
Filed Dec. 10, 1964
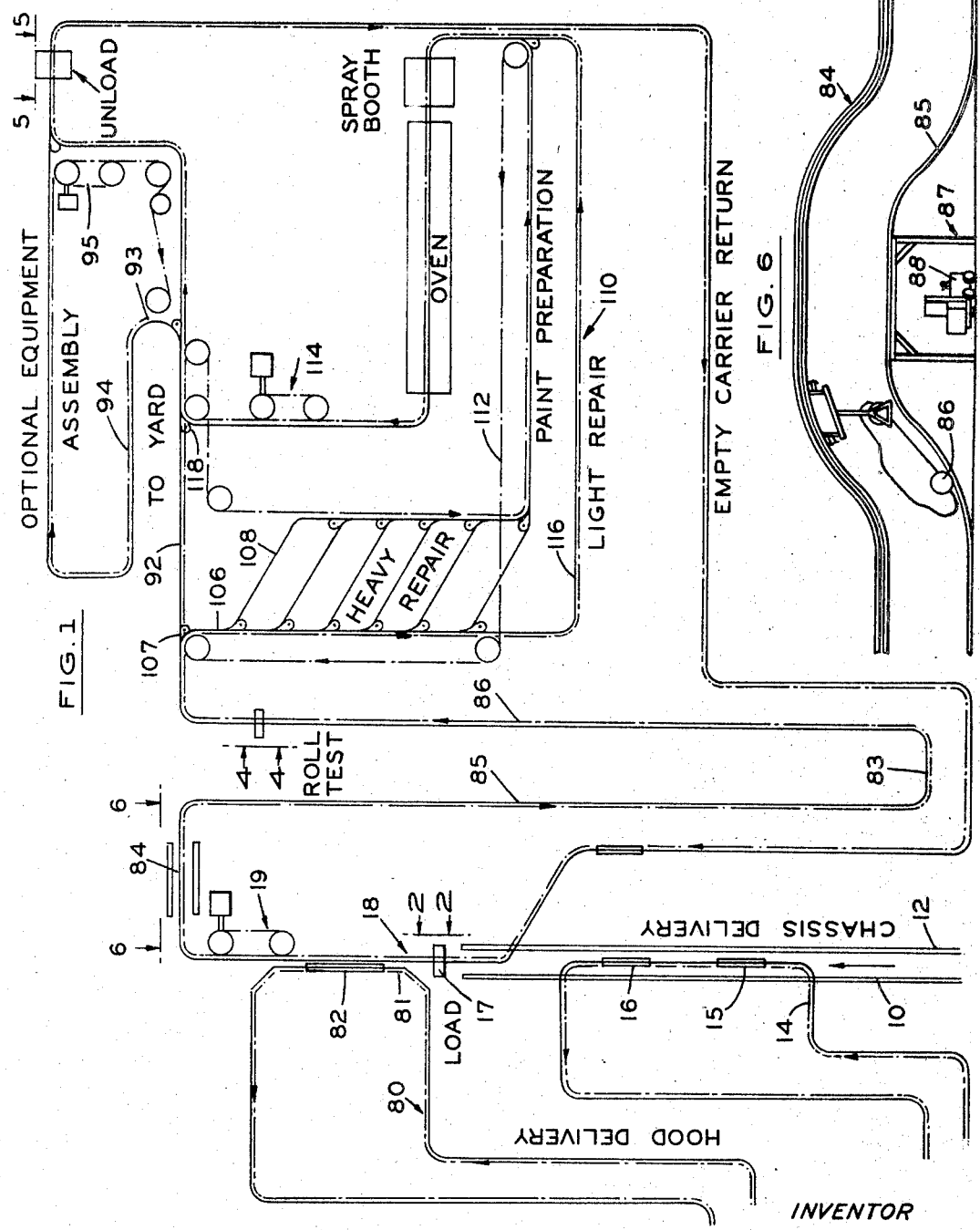
INVENTOR
SHELDON M. KAVIEFF
BY Farley, Forster
and Farley
ATTORNEYS Oct. 8, 1968  S. M. KAVIEFF  3,404,636
APPARATUS AND METHOD FOR FINAL ASSEMBLY OF AUTOMOTIVE VEHICLES
Filed Dec. 10, 1964  3 Sheets-Sheet 2
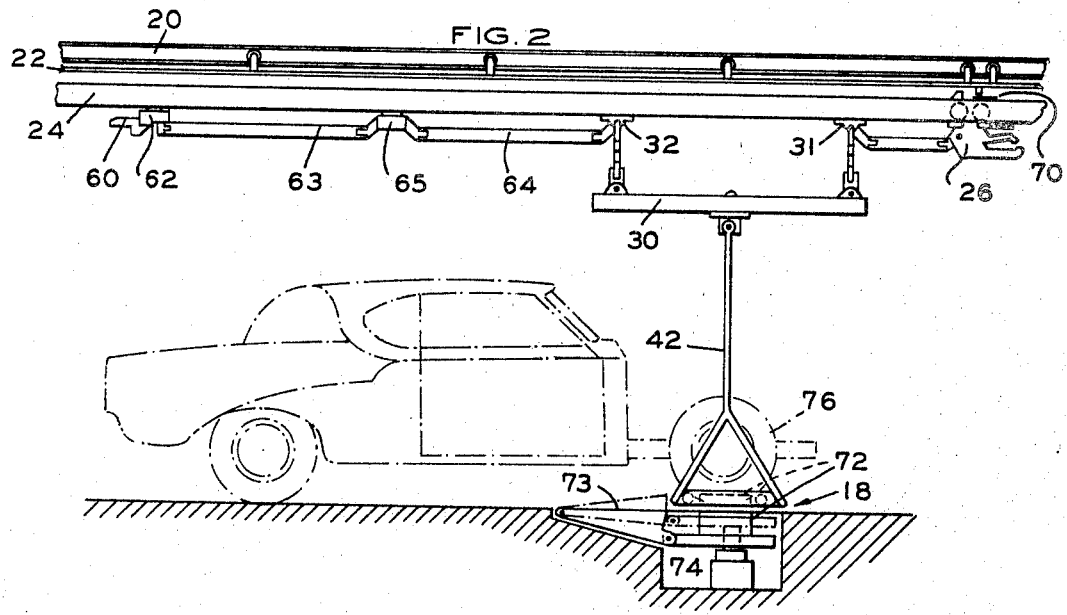
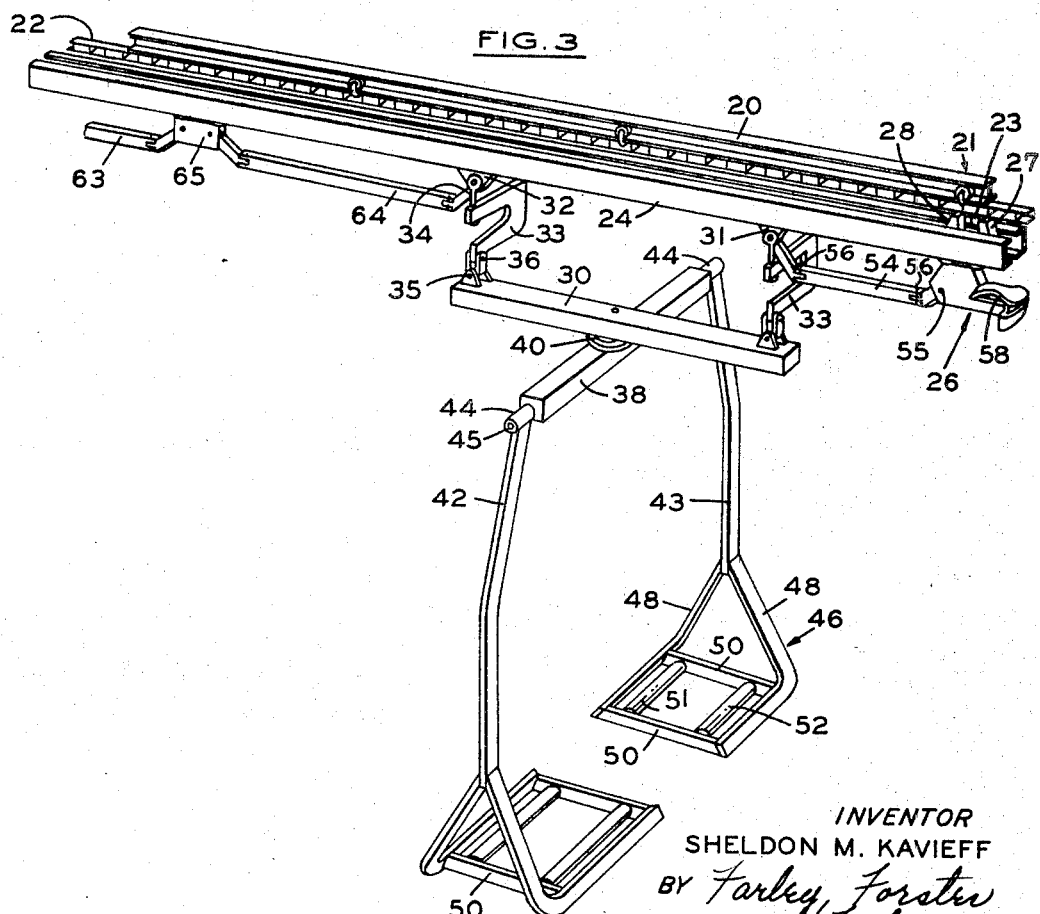
INVENTOR
SHELDON M. KAVIEFF
BY Farley, Forster and Farley
ATTORNEYS Oct. 8, 1968  S. M. KAVIEFF  3,404,636
APPARATUS AND METHOD FOR FINAL ASSEMBLY OF AUTOMOTIVE VEHICLES
Filed Dec. 10, 1964  3 Sheets-Sheet 3
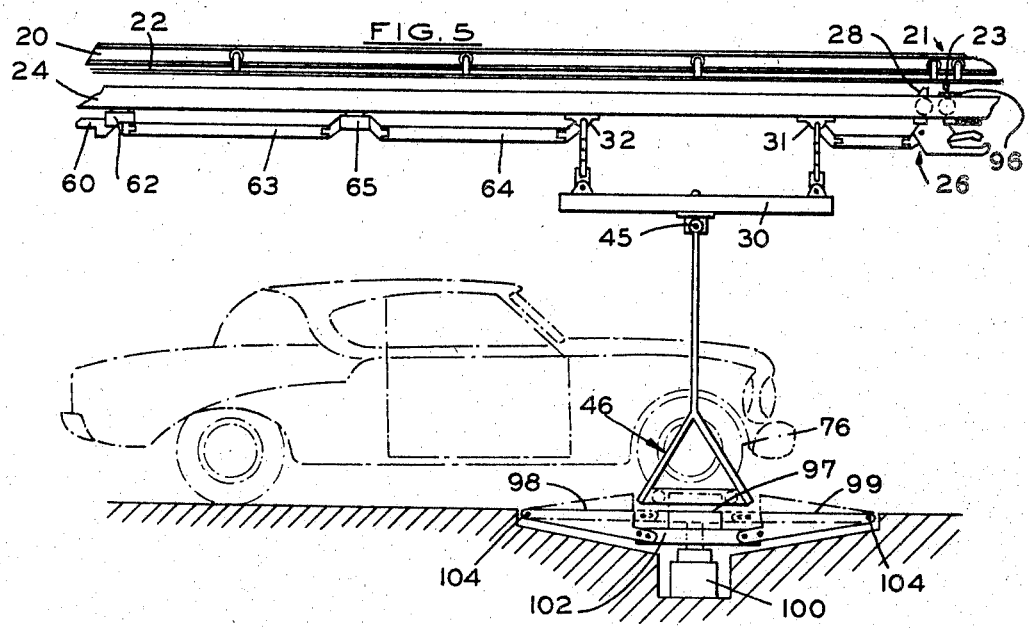
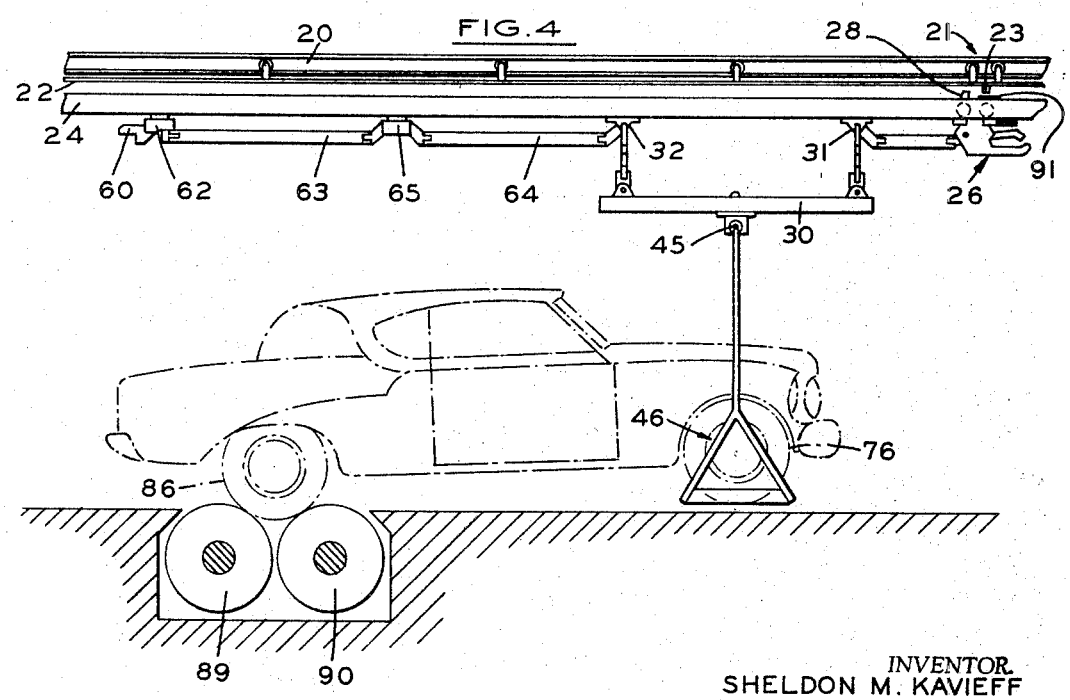
INVENTOR.
SHELDON M. KAVIEFF
BY Farley, Forster and Farley
ATTORNEYS

United States Patent Office 3,404,636
Patented Oct. 8, 1968

3,404,636
APPARATUS AND METHOD FOR FINAL ASSEMBLY OF AUTOMOTIVE VEHICLES
Sheldon M. Kavieff, Farmington, Mich., assignor to Jervis B. Webb Company, Detroit, Mich., a corporation of Michigan
Filed Dec. 10, 1964, Ser. No. 417,419
14 Claims. (Cl. 104—96)

This invention relates to improvements in methods and conveyor apparatus for carrying on final assembly operations on automotive vehicles, either cars or trucks.

Conveyors conventionally employed for final assembly operations on automotive vehicles are of the floor type, such as car conveyors or flat top conveyors onto which a vehicle chassis is loaded at one end and a finished vehicle unloaded from the other end. These conveyors are relatively expensive to install. Once installed, any modifications to the conveyor which may be required by changes in production schedules, techniques or vehicle models, are also expensive and from this standpoint these conveyors are inflexible. They are also inflexible in the sense that a vehicle being assembled travels the entire length of the assembly conveyor at a set pace. It is not practical to remove a vehicle from the line at any intermediate point, or to stop a vehicle on the line, or to provide a variable spacing on the line so that vehicles of different lengths can be assembled on the same line in any order desired.

With conventional final assembly conveyors, the assembly operation and other operations connected therewith are each entirely separate. A vehicle being assembled travels the entire length of the assembly line, is taken off the line and moved to another line or area if some other operation is required.

The principal object of the present invention is to provide improved methods and apparatus which make it possible to employ an overhead trolley conveyor for automotive final assembly operations; to provide a method of conveying a wheeled automotive vehicle through the process of final assembly employing an overhead conveyor; to provide an improved conveyor for final assembly operations, preferably of the overhead power and free type; and to provide an improved system in which all operations related to the automotive final assembly process may be integrated to the extent desired into one conveyor network.

The method of conveying a wheeled automotive vehicle through the process of final assembly, provided by the invention, comprises the steps of suspending one end portion of the vehicle from a carrier of an overhead conveyor, and moving the conveyor carrier to tow the vehicle on the wheels of its unsuspended portion over a supporting surface adjacent to the work stations of the final assembly process.

Apparatus of the invention for the final assembly of wheeled vehicles includes a conveyor having a plurality of carriers suspended from a rail extending above the surface of a final assembly area, each carrier having load engaging means for supporting at least one front wheel of a chassis at a level adjacent and above said surface; means for loading a wheeled chassis on a carrier whereby at least one front wheel of the chassis is carried by the load engaging portion of the carrier with the remaining wheels of the chassis resting on said surface; means for driving the final assembly conveyor to propel the carriers thereof through an assembly area where components are assembled to each chassis to construct a complete vehicle to the extent desired; and means at the end of the assembly area for unloading each vehicle from its carrier.

Preferably, the final assembly conveyor is of the power and free type in which the vehicle carriers travel on an overhead load supporting track with each carrier including a drive member engageable by a pusher of an endless propelling member suspended by trolleys from an adjacent power track. With a power and free conveyor, branch lines may be provided as desired between the steps of the final assembly process so that a vehicle may be diverted at any desired stage, dispatched to another area for the performance of any related operation not common to all vehicles, and returned back to the main assembly line.

The foregoing as well as other features and advantages of the invention will be apparent to those skilled in this art from the following description of the representative embodiment of the invention shown in the accompanying drawings, in which:

FIGURE 1 is a schematic plan view or layout of a final assembly area equipped with a conveyor system of the invention;

FIGURE 2 is a side elevation taken as indicated by the line 2—2 of FIG. 1 showing a station for loading a vehicle on a carrier for final assembly;

FIGURE 3 is a perspective view of a vehicle carrier;

FIGURE 4 is a side elevation taken as indicated by the line 4—4 of FIG. 1 showing a testing station;

FIGURE 5 is a side elevation taken as indicated by the line 5—5 of FIG. 1 showing an unloading station; and FIGURE 6 is an elevation taken as indicated by the line 6—6 of FIG. 1 showing a vertical curve section.

Referring to FIG. 1 a wheeled vehicle chassis is assembled on a conventional conveyor, shown above the label "Chassis Delivery," which, for example, may consist of a pair of parallel strands 10 and 12 of slats traveling in endless vertical loops in the usual manner. The last operation performed on this conveyor is to mount a body on the chassis, the body being delivered on an overhead conveyor 14 which descends along a section 15 to deposit the body on the chassis and then ascends along a section 16. Then the vehicle is delivered to a loading station 17 for transfer to a carrier of the final assembly conveyor 18, driven by a drive unit 19.

FIGURE 3 illustrates the basic construction of the final assembly conveyor which is of the power and free type. A power line includes an I-beam track 20 for trolleys 21 which support an endless chain 22 equipped with depending pushers 23. The free or load track is made up of two opposed channel members 24 which support the trolleys of a carrier.

Each carrier basically includes a main longitudinally extending load supporting bar 30 suspended from two trolleys 31 and 32 by U-shaped brackets 33 each connected to one of the trolleys on a vertical pivot 34 and to the load bar 30 by a transverse pivot 35 and preferably also by a longitudinal pivot 36, this combination of pivots providing universal articulation between the load bar 30 and each of the trolleys 31 and 32. A transverse beam 38 is secured to the load bar 30 by a vertical pivotal connection 40, and a pair of depending arms 42 and 43 each have their upper ends 44 secured to the beam 38 on a horizontal pivot 45. Load engaging means generally designated 46 are secured to the lower end of each of the arms 42 and 43 and consist of a pair of downwardly and inwardly extending members 48 secured to each of the arms 42 and 43 and connected by horizontal braces 50 between which a pair of wheel engaging members, such as rollers 51 and 52, are mounted.

This basic carrier structure enables a vehicle to be supported by its front wheels from an overhead conveyor and towed across a supporting surface in any desired path which may include horizontal curves, vertical curves, or both. If a simple overhead conveyor, rather than a power-and-free conveyor, is adequate for a particular final assembly operation, then the basic carrier structure is connected to the trolleys which support the endless chain 22, and the free trolley track 24 and trolleys are eliminated.

The remaining structure of a carrier optionally includes a tow bar 54 connected between a leading trolley 26 and first load carrying trolley 31 for articulation on horizontal and vertical axes 55 and 56. Leading trolley 26 is equipped with a drive dog 27 and holdback dog 28, and if accumulation of banking of carriers is desired, the driving dog is made releasable. A trolley construction of this type is disclosed in U.S. Patent 3,044,416 and includes a forwardly extending operating arm 58 which when moved upwardly lowers the driving dog 27 to a non-driving position. Such movement takes place when the leading trolley engages a rearwardly extending operating member 60 (FIG. 2) on the rear end of a preceding carrier. This operating member 60 is carried by a trailing trolley 62 pulled by tow bars 63 and 64 connected to the trailing trolley 62, to an intermediate trolley 65 and to the second load carrying trolley 32, with all connections affording pivotal movement on both horizontal and vertical axes as previously described in order to permit the carrier to freely transverse both horizontal and vertical curves.

The combination of trolleys, tow bars and load bars which make up a carrier are selected and arranged to afford the amount of flexibility required to traverse any curved sections provided in the system, having regard to the chording problem encountered, and to provide an overall carrier length between the leading trolley 26 and trailing trolley 62 sufficient to give clearance between loads when carriers are banked or accumulated in end-to-end abutting relation. A way-side stop may be installed any where desired along the system for bringing the carrier to a halt by causing the drive dog of the leading trolley 26 to be moved to a disengaged or non-driving position. If a following carrier overtakes an immediately preceding stopped carrier it will also be brought to a halt through the inter-engagement of the member 58 on the leading trolley with the member 60 of the preceding stopped trolley.

If there is any appreciable difference in the length of vehicles to be assembled and accumulation of carriers is desired, the optional carrier structure described above will ordinarily not be used. Accumulation would instead be accomplished by the provision of wayside stops in the accumulation area rather than by contact between an overtaking carrier and a stopped carrier so that all carriers would not have to have an overall length exceeding that of the longest vehicle.

At the loading station 18 shown in FIG. 2, a way-side stop 70 is provided to bring a carrier to a halt with the load engaging rollers 51–52 of the carrier straddling a vertically movable wheel supporting platform 72. This platform 72, together with an approach ramp 73, is secured to a suitable raising and lowering device such as the fluid pressure cylinder 74 which when actuated elevates the ramp 73 and platform 72 to the position shown in broken line, permitting the vehicle to be rolled onto the platform and its front wheels 76 positioned between the wheel supporting rollers 51–52. The ramp and platform are then lowered, the stop 70 released and the carrier will be picked up and moved on down the assembly line by the next advancing pusher.

As shown in FIG. 1 the conveyor 19 may be installed in any path desired for best performance of the necessary assembly operations in the area available. Other conveyors may be employed to deliver necessary parts for final assembly operations. For example, in FIG. 1 a power and free conveyor 80 equipped with special carriers for supporting a set of front fenders, a hood and other parts required in final assembly follows a path which includes a section 81 extending parallel to the main assembly conveyor, and along this section 81 the hood and fender carrier and vehicle carrier travel in side-by-side relation; if desired, the section 81 may include a portion 82 where the hood and fender carriers travel at a lower elevation for easier working conditions.

The flexibility of the conveyor with respect to changes in the direction of travel is another important feature. A horizontal turn can be negotiated on a radius within the wheel base of the vehicle being conveyed which is very important from a space-saving standpoint, especially in any instance where a 180 degree change in direction is required. A 180 degree turn with presently used types of final assembly conveyors requires considerable room and is relatively costly, while in contrast, a 180 degree turn such as that shown at 83 in FIG. 1 can be provided within the relatively small space requirement outlined above by simply bending the conveyor tracks either in two 90 degree portions as shown or in a continuous 180 degree arc.

A vertical change in direction can also be provided with relative ease and low cost. As shown in FIGS. 1 and 6, a vertical curve section 84 consists merely of vertical bends in the conveyor tracks, ramps 85 for the vehicle rear wheels 86 and ramp supporting structure 87. Such a vertical curve section can be employed to bridge an aisleway for floor traffic and thereby provide freer access to the work stations of the assembly area so as to facilitate the stocking of work stations by such means as the lift truck 88.

Assembly operations proceed as the carriers tow the vehicles across the surface of the assembly area until the roll test station shown in FIG. 4 is reached at which station all normal assembly operations will have been performed and a vehicle completed except possibly for the installation of some optional equipment. At the roll test station a vehicle is advanced until its rear wheels 86 are cradled between a pair of rotatable rollers 89 and 90, the drive dog of the leading trolley 26 is depressed by engagement with a way-side stop 91, and the rollers 89 and 90 then revolved by suitable means not shown to check the driving components of the vehicle. The stop 91 is then released and the carrier allowed to proceed.

If the vehicle passes final inspection the carrier is routed either directly along section 92 of the conveyor to the unload station shown in FIG. 5 or to a branch line 93 if the installation of optional equipment is required. The branch line 93 includes a power track, chain and pushers 94 and a drive unit 95, permitting carriers to be advanced at the rate desired through the optional equipment assembly area, and integrates this operation into the final assembly process. Presently employed methods and apparatus for final assembly requires that optional equipment be installed at a separate area to which vehicles are usually driven with resulting increased labor requirements and problems.

When a carrier reaches the unload station of FIG. 5 it is again halted by a stop 96 in registry with the vertically movable platform 97 of an unloading device which includes an approach ramp 98 and an exit ramp 99 all movable vertically by an actuating cylinder 100. The ramps 98 and 99 are each pivoted at one end to a beam 102 movable by the cylinder 100 and are pivotally connected to suitable fixed structure at their other ends as indicated at 104. When the ramps 98 and 99 and platform 97 are in their elevated position as shown in broken line, the front wheels 76 of the vehicle are lifted off their supporting rollers 51 and 52. An operator then starts the vehicle and drives it off the carrier and the assembly line.

In the event the vehicle fails to pass final inspection its carrier is dispatched onto a branch line 106 by a switch 107 and, depending upon the nature of the repair required, the carrier is then either diverted onto one of a plurality of branch free lines 108 for heavy repair or forwarded by the branch power and free conveyor 106 to a light repair area 110.

The branch power and free conveyor 106 is arranged to be serviced by a single power track, chain and pushers, indicated schematically by the broken line 112 in FIG. 1 and driven by a drive unit 114. The path of the carrier supporting track, indicated schematically by the solid line 116, may extend through a spray booth and oven as indicated and back to a transfer zone with the main conveyor at a switch 118 in advance of the optional equipment assembly branch line 93.

The assembly conveyor layout shown in FIG. 1 is not intended to depict any particular installation but rather to illustrate the manner in which some of the operations involved in the final assembly of vehicles can be correlated into one conveyor system and performed with the vehicle supported and towed by a carrier of an overhead conveyor with the vehicle travelling a circuitous path including either or both vertical and horizontal turns with the carrier passing through switches and being transferred from one conveyor to another in the assembly process.

Where changes in vertical direction are not present or at least are very gradual a vehicle can be moved through the assembly area with only one of its front wheels engaged and supported by a carrier.

While preferred embodiments have been described above in detail, it will be understood that numerous modifications might be resorted to without departing from the scope of the invention as defined in the following claims.

I claim:

1. Apparatus for the final assembly of wheeled vehicles including the combination of a surface on which the vehicles can roll; an overhead conveyor arranged in an endless path at least a portion of which extends above said surface from the beginning to the end of the final assembly process; work stations of the final assembly process arranged along said portion of the overhead conveyor; the conveyor including pairs of leading and trailing trolleys, a trolley supporting track, a plurality of carriers and means for moving the carriers; each carrier comprising a load bar and pivot means connecting the load bar to each of a pair of leading and trailing trolleys for pivotal movement on a vertical axis and on an horizontal axis transverse to the load bar, and load supporting structure secured to the load bar for movement on a vertical pivot during movement of the carrier, said load supporting structure including a depending portion having means at the lower end thereof for engaging and supporting a portion of a vehicle at a level adjacent and above said supporting surface whereby such vehicle will be towed across said supporting surface on the wheels of its unsupported portion by movement of the conveyor carrier; and loading and unloading means mounted adjacent the path of carrier travel over said supporting surface for placing said portion of a vehicle respectively in engagement with and disengagement from said engaging and supporting means of the load supporting structure of a carrier.

2. Apparatus as claimed in claim 1 wherein each carrier further includes means for permitting relative pivotal movement between the load bar and depending portion of the load supporting structure on an axis transverse to the direction of carrier movement.

3. Apparatus as claimed in claim 2 further including vertically ascending and descending curve sections in the overhead conveyor, and ramp means between said curve sections for supporting the unsupported wheels of a vehicle at a level above said surface.

4. Apparatus as claimed in claim 2 wherein the ramp means forms a bridge over an aisleway for traffic across said surface.

5. Apparatus as claimed in claim 1 wherein the vehicle engaging and supporting means includes structure for carrying at least one wheel of a vehicle.

6. Apparatus as claimed in claim 1 wherein the conveyor further includes a power line adjacent to the trolley supporting track, the power line comprising a track, trolleys and an endless chain supported thereby; the means for moving the carriers consisting of means for driving the endless chain, pusher members carried thereby and a driving dog on each carrier engageable by a pusher member.

7. Apparatus as claimed in claim 6 further including a branch carrier track intermediate the beginning and end of the final assembly process and means for diverting selected carriers to the branch track for the performance of an operation on the vehicles supported by such selected carriers which is not required on all vehicles passing through the final assembly process.

8. Apparatus as claimed in claim 1 wherein the vehicle engaging and supporting means includes structure for carrying one pair of wheels at one end of a vehicle.

9. Apparatus as claimed in claim 1 wherein the load supporting structure includes a member secured intermediate its ends to the load bar on a vertical pivot, a pair of depending arms pivotally connected to the member on an axis extending longitudinally thereof, and said vehicle engaging and supporting means including structure at the lower end of the depending arms for carrying one pair of wheels at one end of a vehicle.

10. Apparatus for conveying a wheeled vehicle across a surface on which the vehicle can roll; including an overhead conveyor arranged in an endless path at least a portion of which extends above said surface from a first location to a second location; the conveyor including a track, a carrier mounted thereon and means for propelling the carrier along the track; the carrier including a leading and a trailing trolley, a load bar, pivot means connecting the load bar to the leading and trailing trolleys, and load supporting structure secured to the load bar for movement on a vertical pivot as the carrier is propelled along the track; said load supporting structure including a depending portion having means engageable with a portion of the vehicle whereby such vehicle will be towed across the surface on at least some of its wheels by movement of the conveyor carrier; and means at the first and second locations for engaging said portion of the vehicle with the load supporting structure of the carrier at the first location and disengaging said portion of the vehicle from said structure at the second location.

11. Apparatus as claimed in claim 10 wherein the depending portion of the load supporting structure includes means for supporting at least one wheel of the vehicle at a level above the surface.

12. Apparatus as claimed in claim 10 wherein the carrier further includes means pivotally connecting the depending portion of the load supporting structure to the remaining portion thereof.

13. Apparatus as claimed in claim 10 wherein the depending portion of the load supporting structure includes means for supporting one end of the vehicle at a level above the surface.

14. Apparatus as claimed in claim 10 wherein the load supporting structure includes a beam member secured intermediate its ends to the load bar on a vertical pivot, the depending portion of the load supporting structure including a pair of arms pivotally connected to the beam member, and said vehicle engaging means including structure at the lower end of the depending arms for carrying one pair of wheels at one end of a vehicle.

(References on following page)

References Cited

UNITED STATES PATENTS

| | | | |
|---|---|---|---|
| 1,434,030 | 10/1922 | Stone | 214—46.34 |
| 2,022,186 | 11/1935 | Butler | 104—171 |
| 3,265,012 | 8/1966 | Beitzel et al. | 104—170 |
| 519,561 | 5/1894 | Berg | 104—172 |
| 1,725,264 | 8/1929 | Garnett | 105—156 |
| 1,968,373 | 7/1934 | Carter | 105—156 |
| 2,470,060 | 5/1949 | Webb et al. | 105—156 X |
| 2,538,998 | 1/1951 | Whitcroft | 105—156 X |
| 2,586,263 | 2/1952 | Rose | 105—156 |
| 2,931,316 | 4/1960 | Blackwell | 104—172 |
| 3,200,766 | 8/1965 | Gorjanc | 104—88 |
| 3,249,064 | 4/1966 | Barry | 104—89 X |

ARTHUR L. LA POINT, *Primary Examiner.*

J. E. BABER, D. F. WORTH, *Assistant Examiners.*